June 25, 1968 M. J. DI TORO 3,390,336

APPARATUS AND METHOD FOR CONVERTING AN INPUT WAVE SIGNAL USING ADAPTIVE NETWORK ADJUSTED TO TIME INVERSE OF TRANSLATING CHANNEL

Filed Jan. 24, 1966 8 Sheets-Sheet 2

June 25, 1968 M. J. DI TORO 3,390,336

APPARATUS AND METHOD FOR CONVERTING AN INPUT WAVE SIGNAL USING ADAPTIVE NETWORK ADJUSTED TO TIME INVERSE OF TRANSLATING CHANNEL

Filed Jan. 24, 1966 8 Sheets-Sheet 3

United States Patent Office 3,390,336

Patented June 25, 1968

3,390,336

APPARATUS AND METHOD FOR CONVERTING AN INPUT WAVE SIGNAL USING ADAPTIVE NETWORK ADJUSTED TO TIME INVERSE OF TRANSLATING CHANNEL

Michael J. Di Toro, Massepequa, N.Y., assignor to Cardion Electronics, Inc., a corporation of Delaware Filed Jan. 24, 1966, Ser. No. 522,519

11 Claims. (Cl. 325—65)

ABSTRACT OF THE DISCLOSURE

A system for correcting for dispersion and distortion of a signal translated through a medium having nonlinear amplitude and frequency response characteristics which includes certain adaptive correction networks which are readjusted or reset in a number of sequential steps and in a converging manner to obtain optimum correction. A distorted and dispersed receive pulse signal is first passed through a signal storage adaptive network the response of which is to be adjusted. The received pulse signal is also passed through a second signal storage adaptive network which is automatically adjusted to have a response which is the time-reverse of the wave form of the received distorted pulse signal. The output of the latter network is compared with a signal of desired wave form and the difference or error signal is utilized to adjust the response characteristic of the first adaptive network. The adjustments of the latter network are made in sequence in response to the transmission of a series of test pulses through the distorting medium, the arrangement being such that the error signal progressively diminishes. After the adaptive networks have been adjusted as described, the system is capable of receiving signals of any type and wave form and correcting them for the distortion and dispersion by the transmitting medium.

This invention relates to an apparatus and a method for converting an input wave signal into a signal of given wave form and, while it is of general application, it is particularly adapted for use in a signal communication channel including a signal transmitter-receiver system having a link which has nonlinear phase-frequency and non-flat amplitude-frequency characteristics resulting in distortion and dispersion of a transmitted signal.

In applicant's prior Patents 3,206,687 and 3,206,688, dated Sept. 14, 1965, and in applicant's copending applications Ser. No. 332,492, filed Dec. 23, 1963, and Ser. No. 416,288, filed Dec. 7, 1964, there are described and claimed several apparatus for minimizing distortion in wave-signal translating channels, particularly the dispersion arising from a nonlinear phase-frequency transfer characteristic or from an amplitude-frequency response characteristic of large slope, or both. The apparatus described in aforesaid patents is particularly adapted for use where the response characteristic of the channel may vary extremely rapidly, for example a channel including an earth-ionosphere duct link, but operation in such rapidly varying channels is achieved at the expense of relatively complex and costly apparatus.

In certain applications, dispersion correction at such a high speed is not required, for example, in the correction of distortion and dispersion in conventional voice telephone circuits. When two telephone subscribers are connected by different channels from call-to-call, the amplitude-frequency and phase-frequency response of the interconnection varies from channel-to-channel and from call-to-call and such variations degrade the quality of communication. This is particularly important when such voice channels are used for data transmission.

The present invention represents an extension and simplification of the dispersion and distortion correcting networks described and claimed in aforesaid patents and copending applications, in which the dispersion correction networks are readjusted or reset in a number of sequential steps and in a converging manner to obtain an optimum correction.

The application of the present invention in its more general sense includes an adaptive network which sequentially shapes itself such that when a signal of any wave form is fed into the network, the output signal is converted in wave form to any given desired wave form.

Where such an apparatus is used in communication over dispersive transmission media such as voice-quality telephone lines, the signal input wave form is the dispersed impulse response of the transmission medium, while the desired output wave form is a large-amplitude narrow main lobe or pulse with side lobes of minimal energy. Other desired output wave forms can be realized, as in high-speed data transmission in which the desired wave form is one which approximates the function $(\sin 2\pi f_c t)/(2\pi f_c t)$, where $t$ is time, $f_c$ is the cutoff frequency of the base-band channel, and the data sampling epochs are at multiples of $(1/2 f_c)$. This function has a unity main lobe at zero time and zero side lobes at all other sampling epochs, thus producing no intersymbol interference in the transmitted data. Unlike adaptive networks heretofore proposed, the apparatus of the present invention places no limitation on the particular input or output wave shapes and is useful not only in communication systems but as wave-form identification apparatus and as a network synthesizer.

In accordance with the invention, in a wave-signal translating channel there is provided an apparatus for converting an input wave signal into a signal of a given wave form comprising a first input circuit for supplying a signal of a wave form to be converted, a first signal-storing adaptive network coupled to the first input circuit and having an output circuit at which said converted input signal appears, a second input circuit for supplying a signal of the given wave form, a circuit for comparing from instant-to-instant the signal at the adaptive network output circuit with the signal of given wave form and deriving the difference signal, a second adaptive network coupled to the output of the comparing circuit and having a response which is the time-reverse of the wave form of the input signal for developing a correction signal, and a circuit for applying the correction signal to the first adaptive network to modify its response in a sense to decrease the energy of the difference signal. The term "wave form" is used herein and in the appended claims to refer to the variation of a signal as some function of time but not necessarily regular in form or occurring periodically.

Further in accordance with the invention, there is provided a method of converting an input wave signal into a signal of a given wave form which comprises passing the input signal through a first signal-storing adaptive network, comparing from instant-to-instant the output signal of such adaptive network with a signal of such given wave form and deriving therefrom a difference signal, passing the difference signal through a second signal storing adaptive network having a response which is the time-reverse of the wave form of the input signal to develop a correction signal, and applying the correction signal to the first adaptive network to modify its response in a sense to decrease the energy of such difference signal.

For a better understanding of the present invention, together with other and further objects thereof, reference is had to the following description, taken in connection with the accompanying drawings, while its scope will be pointed out in the appended claims.

Referring now to the drawings.

Figures 1, 2:
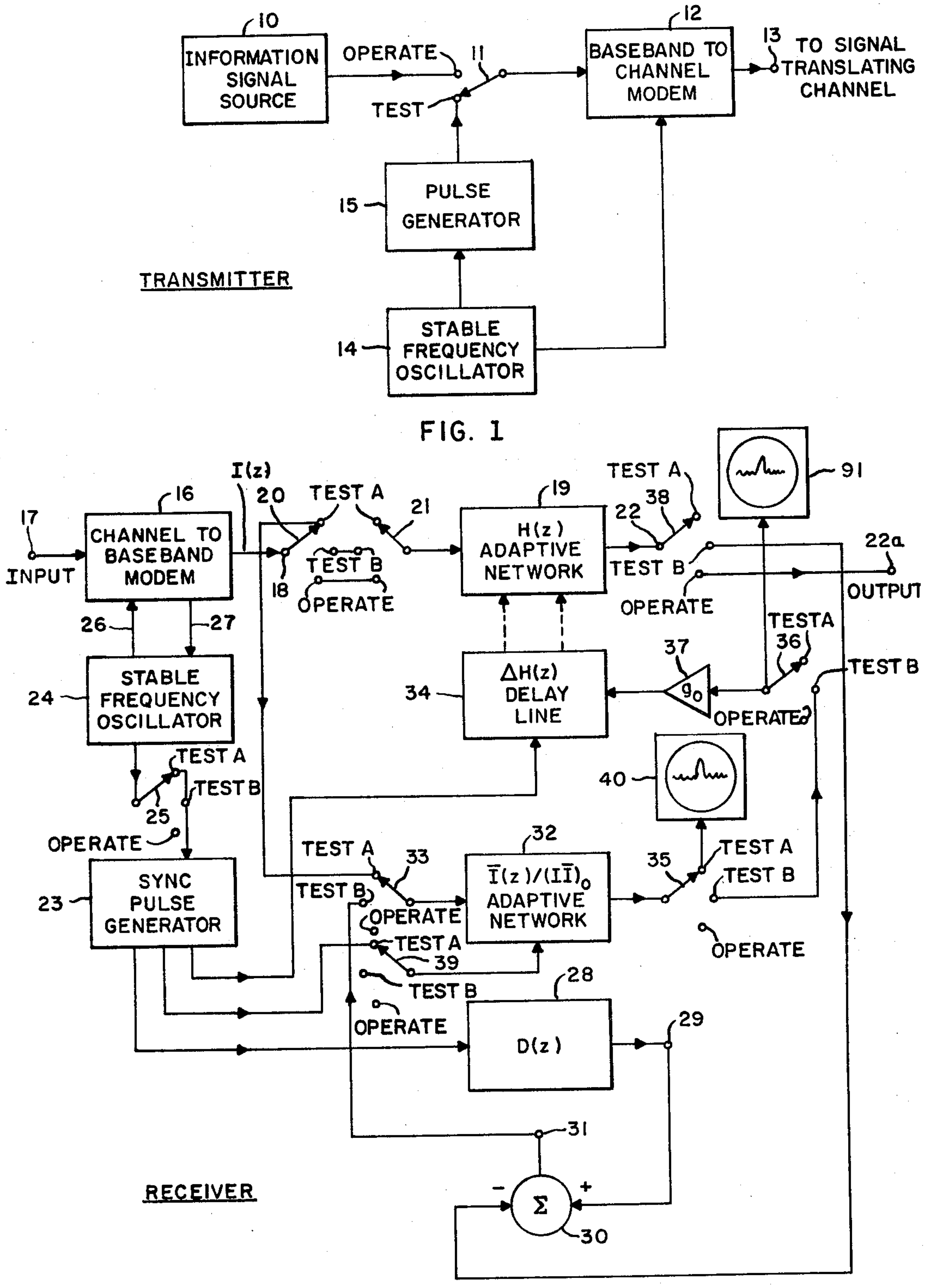
FIG. 1 is a schematic representation of a transmitter useful in practicing the method of the present invention.
FIG. 2 is a schematic representation of a receiver working in cooperation with the transmitter of FIG. 1 in practicing the method of the invention.
Figure 3:
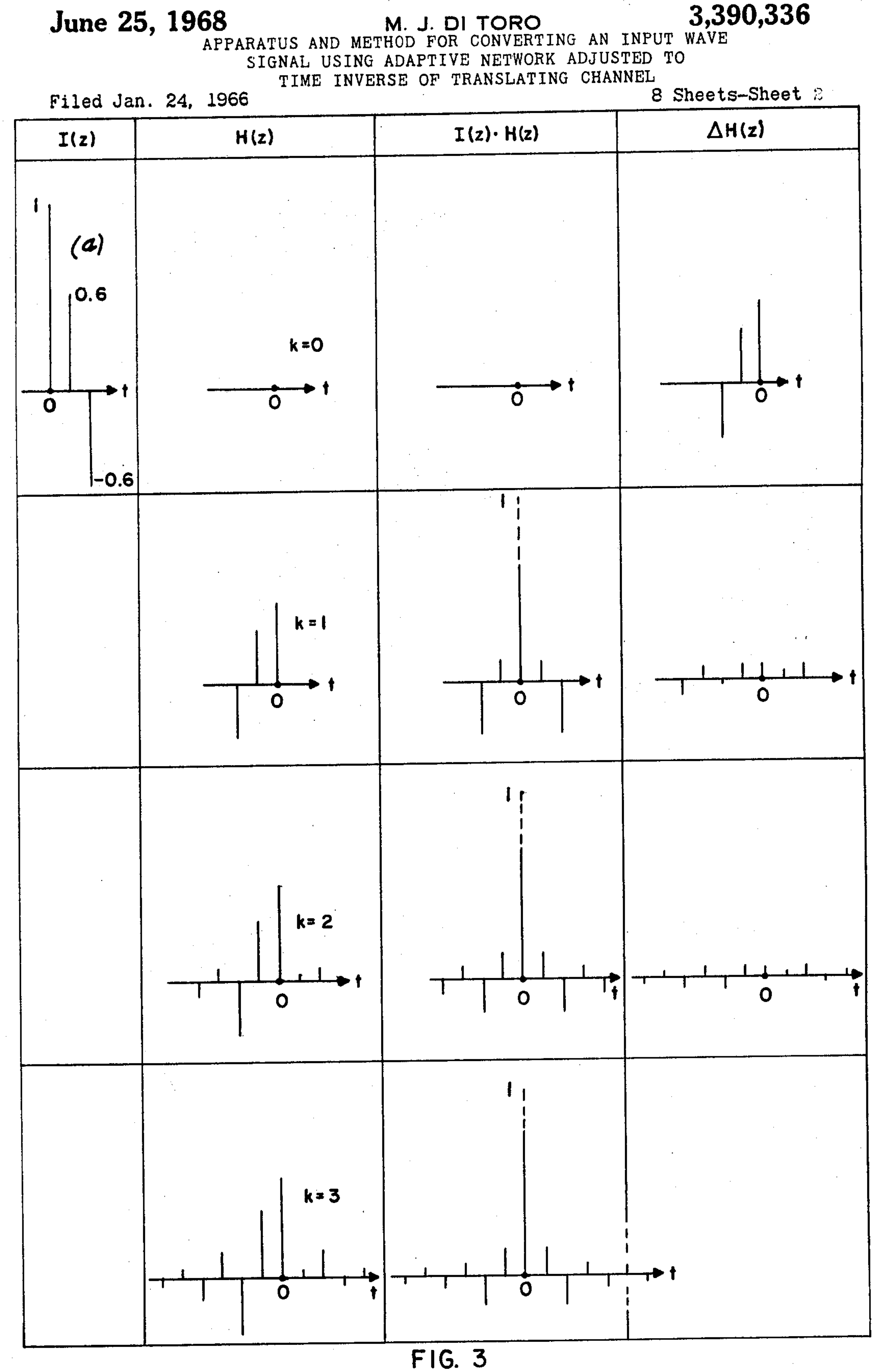
Figure 4:
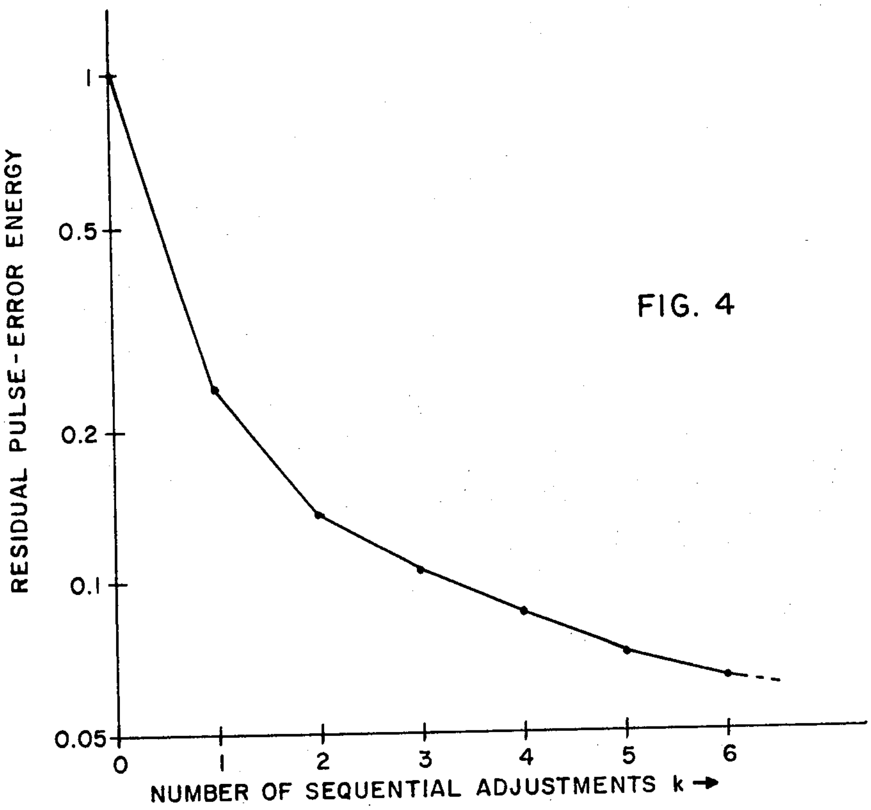
Figure 5:
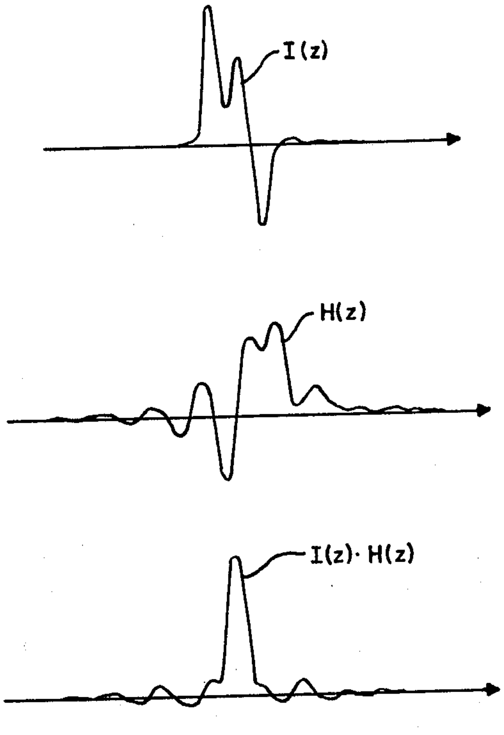
Figure 6:
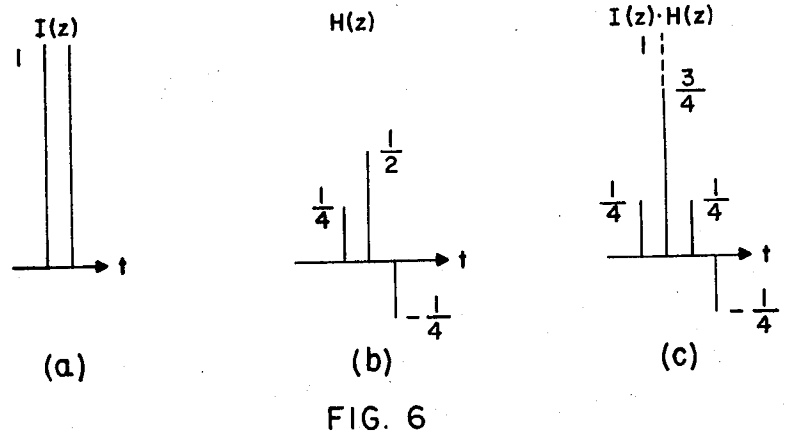
Figure 7:
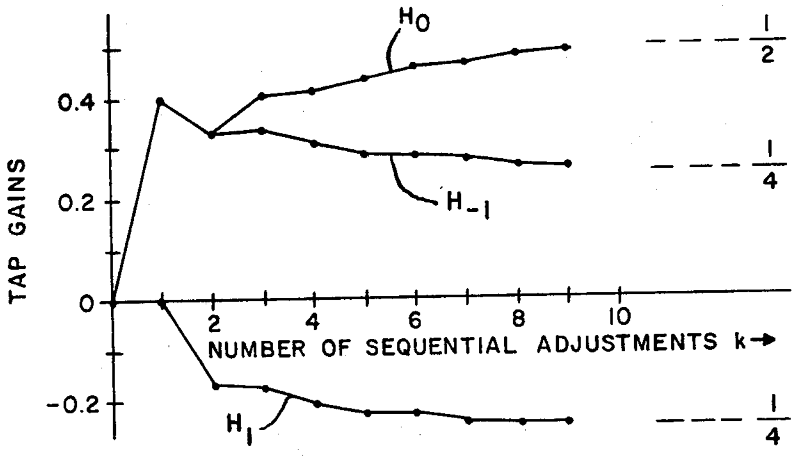
Figure 8:
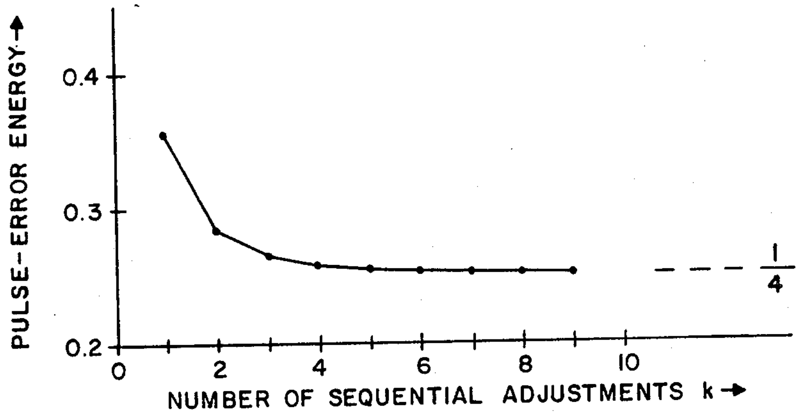
Figure 9:
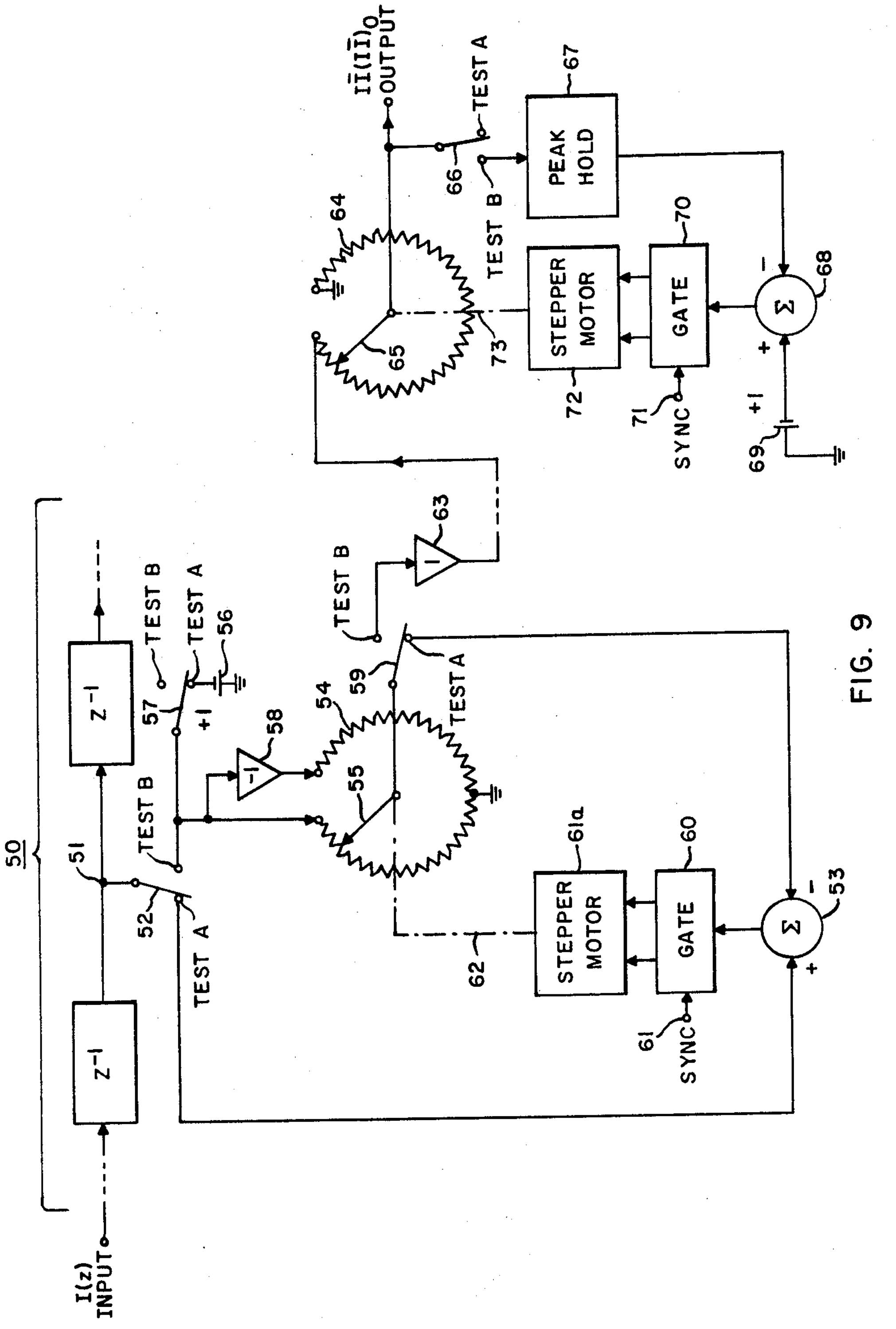
Figure 10:
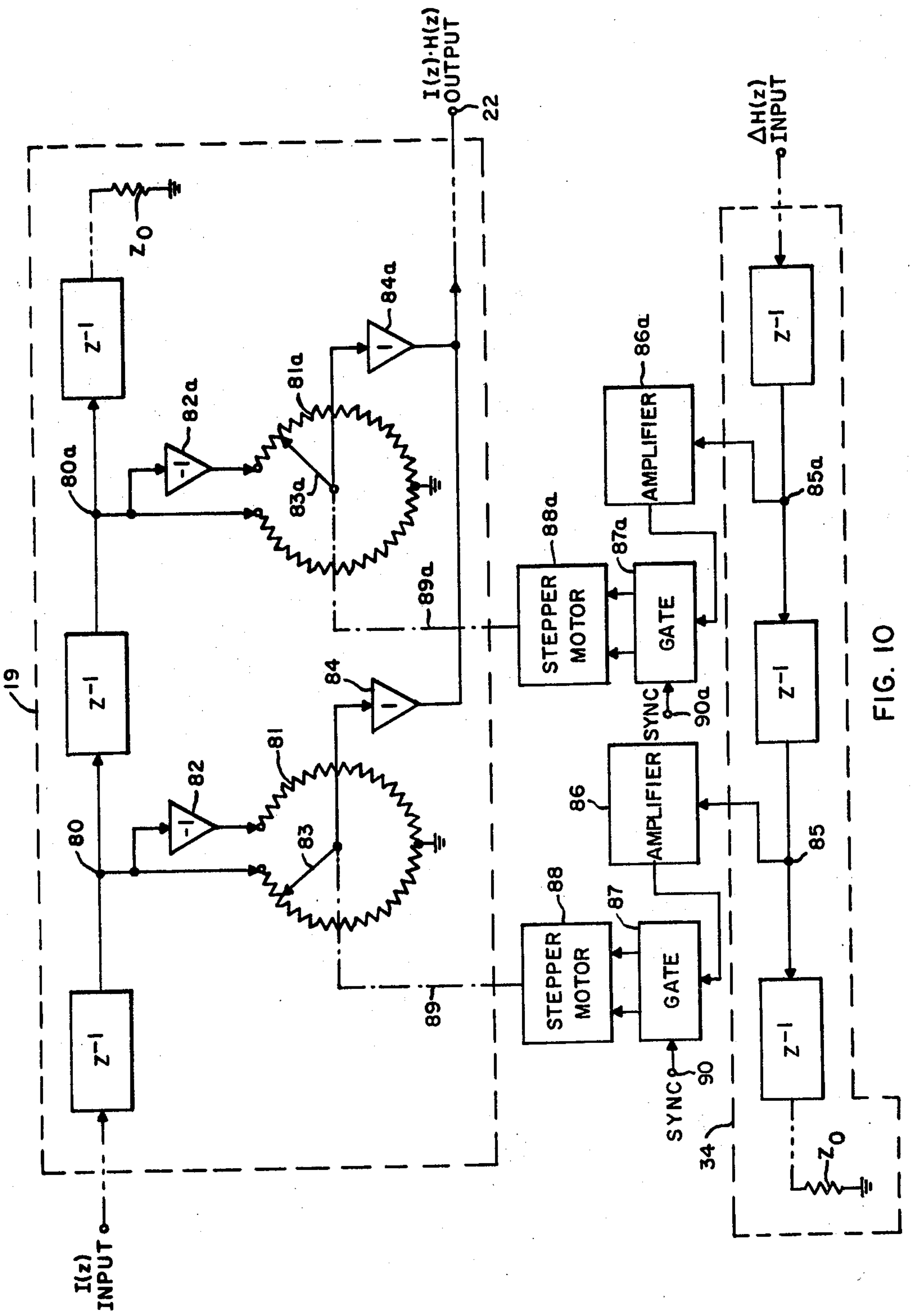
Figure 11:
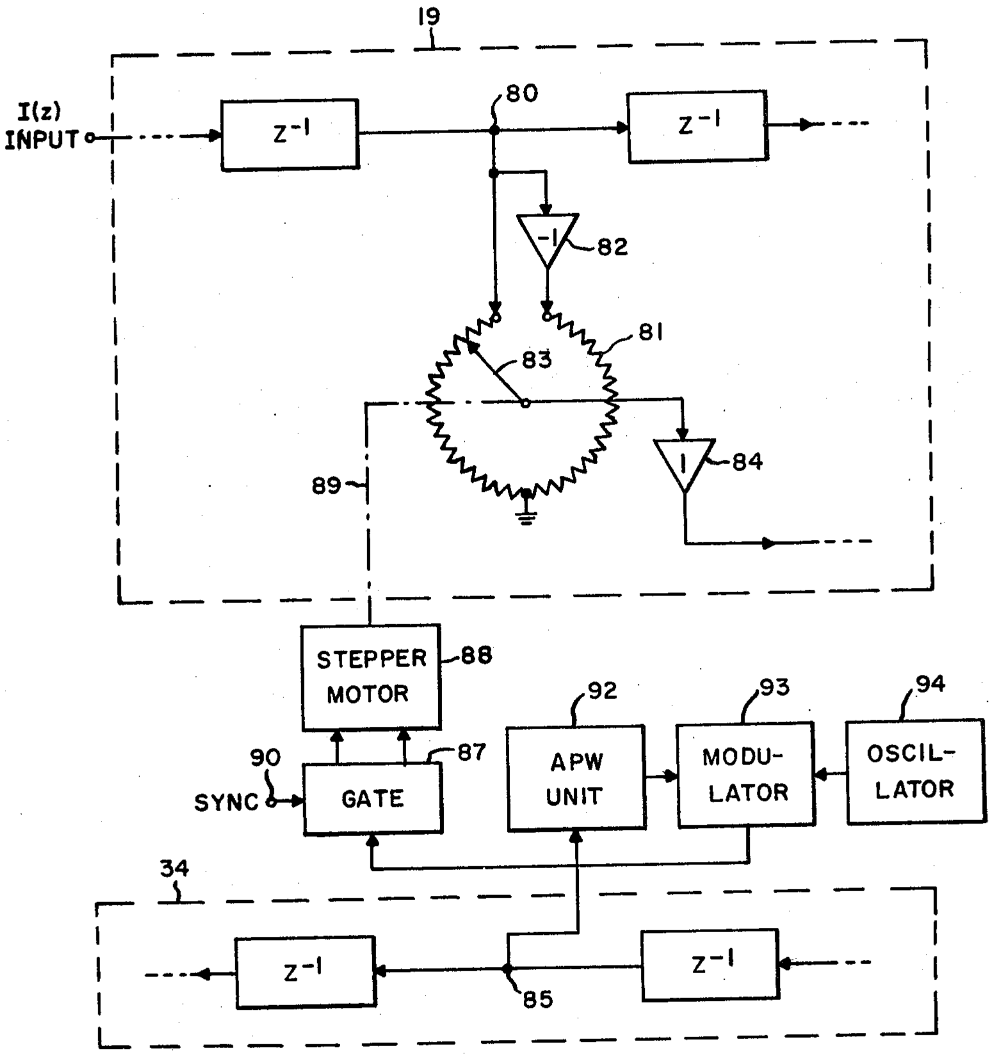
Figure 13:
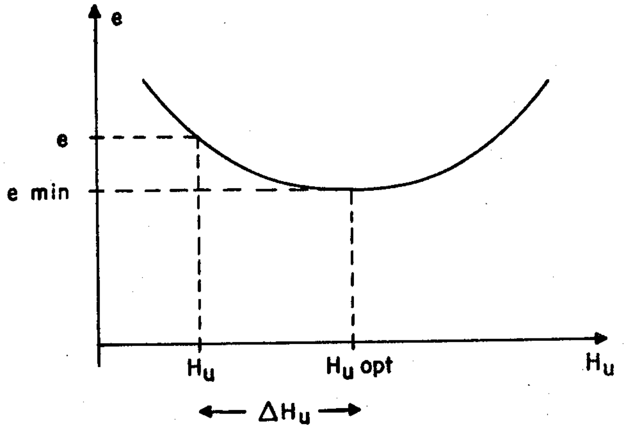
Figure 14:
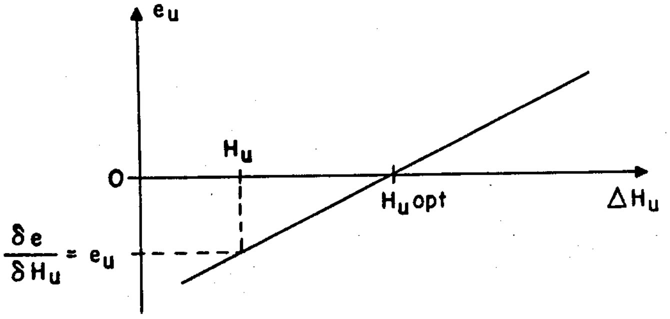
Figure 12:
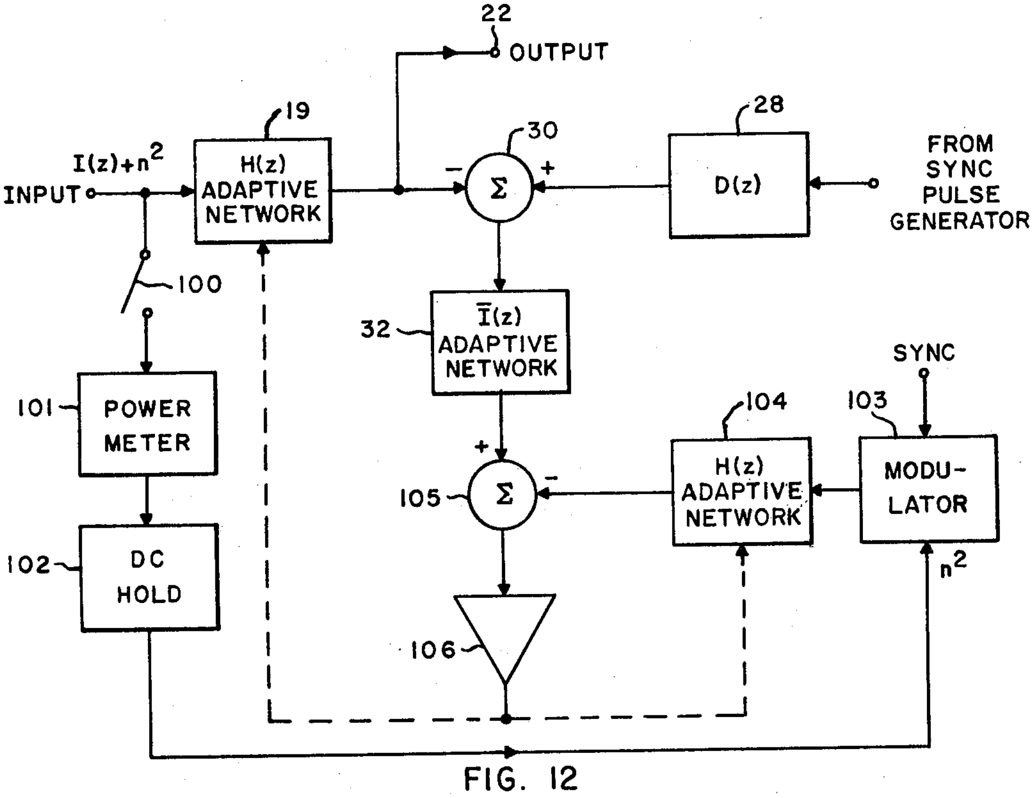

FIG. 3 comprises a series of graphs or wave forms to aid in explaining the invention;

FIG. 4 is a graph of the variation of the residual pulse-error energy of a signal translated by the apparatus of FIG. 1 plotted against the number of sequential adjustments;

FIG. 5 is a reproduction of oscillograms experimentally confirming the results shown in FIG. 3;

FIG. 6 is a series of charts or wave forms representing correction of a signal with an adaptive network having only three taps;

FIG. 7 comprises a series of curves showing the sequential variations in the settings or gains of the three taps as the number of sequential adjustments is increased;

FIG. 8 is a graph representing the residual pulse-error energy corresponding to the curves of FIG. 7;

FIG. 9 is a schematic detail diagram of interconnections between the second adaptive network for the difference signal and the input circuit of the system of FIG. 2 by which such second adaptive network is automatically adjusted;

FIG. 10 is a schematic detail diagram of the interconnections between the first adaptive network in the main signal channel and the error-signal delay line of the apparatus of FIG. 2;

FIG. 11 is a schematic detail diagram of a modified form of the apparatus of FIG. 10;

FIG. 12 is a schematic representation of a modified form of the apparatus of FIG. 2 including provisions for taking into account the presence of wide-spectrum channel noise;

FIG. 13 is a graph showing variations of error-signal energy with incremental variations in tap gain of the first adaptive network, while FIG. 14 is a graph of variations in the rate of change of error-signal energy shown in FIG. 13.

Before describing the physical apparatus embodying the present invention, it will be helpful to set forth certain fundamental relationships, assuming the application of the invention to a pulse-communication system including a dispersing and distorting link.

In aforesaid copending application Ser. No. 416,288, it is shown that the transfer function or impulse response I(z) of a dispersive link may be expressed as:

$$I(z)=1+R(z) \qquad (1)$$

where $$R(z)=a_{-m}z^{m}+a_{-m+1}z^{m-1}+\ldots+a_{-1}z^{1}+0+a_{1}z^{-1}+\ldots+a_{m}z^{-m} \qquad (2)$$

Equation 1 indicates that the received dispersed and multipath base-band signal, on transmission of an impulse, comprises a desired primary pulse of reference unity magnitude and undesired side pulses $a_{-m}$ to $a_m$ (excluding $a_0$). The notation used is that of the Z transform where $z=\epsilon^{p}$ and $p$ is the usual La Place transform complex variable, and unit time cells are assumed. Equation 1 indicates an impulse response including a main pulse of unity magnitude at time 0 and side pulses defined by Equation 2.

Assume that it is desired to form a correcting network which is effective to reduce or relax any selected side pulse of R(z) such as that represented by the coefficient $a_w$ occurring at time cell $w$. It is shown in aforesaid copending application, Ser. No. 416,288, that the optimal correcting network to satisfy this condition is that having a transfer function H(z):

$$H(z)=1+bz^{-w} \qquad (3A)$$

$$=\bar{I}(1-I)/(I\bar{I})_0 \qquad (3B)$$

where:

$$b=-\frac{a_w+(R\bar{R})_w}{1+(R\bar{R})_0}$$

$\bar{R}(z)$=the conjugate of R(z) obtained by replacing $z$ by $z^{-1}$ $(R\bar{R})_0$=the coefficient of $z^0$ term in $R\bar{R}$ $(R\bar{R})_w$=the coefficient of the $z^{-w}$ term in $R\bar{R}$.

(For a description of the Z transform, see "Sampled Data Control Systems" by J. R. Ragazzini et al., McGraw-Hill, 1958.)

This invention is concerned with the generalization of Equation 3A and, particularly, the generalization of Equation 3B. That is, to find a network H(z) which will convert any input wave form I(z), and even one with no discernible main lobe, into another desired wave form D(z). Thus, when I(z) is fed into H(z), the output I(z)H(z) is to be close to D(z) in some optimal sense. The optimal criterion may be, for example, that the sum of the squares of the differences between the pulses of I(z)H(z) and those of D(z) be a minimum.

Referring now to FIGS. 1 and 2 of the drawings, there is represented a system for converting an input wave signal into a signal of a given wave form which is of general application but which is illustrated as embodied in a pulse-signal communication channel including a signal transmitter such as shown in FIG. 1 and a signal receiver such as represented in FIG. 2 and including a link having nonflat amplitude-frequency and nonlinear phase-frequency characteristics, for example the earth-ionisphere duct, resulting in distortion and dispersion of a transmitted signal. The transmitter of FIG. 1 includes an information signal source 10 adapted to be coupled via a two-position switch 11 to a base-band-to-channel modem 12 having output terminals 13 for transmitting a signal via a wire or radio signal-translating channel. The transmitter of FIG. 1 further includes a stable-frequency oscillator 14 coupled to the unit 12 for stabilizing the carrier frequency of the output signal. The oscillator 14 is also coupled to a pulse generator 15 which is connected via the switch 11 to the unit 12. The generator 15 is designed to develop periodic pulses of short duration and of a relatively low repetition rate, for example 50 c.p.s. For simplicity and clarity, the circuit diagrams of the drawings are shown as single-wire diagrams although it will be understood that, in practice, conventional two-wire circuitry will be used.

It is assumed that in the transmission of the signal from the transmitter of FIG. 1 to the receiver of FIG. 2, the signal undergoes distortion and dispersion. The receiver of FIG. 2 comprises apparatus for restoring a signal received via such a channel to a signal of pulse wave form. This apparatus includes a channel-to-base-band modem 16 coupled to input terminals 17. If the communication is via a direct-wire link, the terminals 13 of FIG. 1 will be connected via the link directly to the terminals 17. In the event that this channel is a radio link, a conventional radio receiver will be interposed in advance of the terminals 17.

The unit 16 is provided with output terminals 18 which comprise a first input circuit for the system, for supplying a signal of a wave form to be converted, that is, a distorted and dispersed signal received via the signal-translating channel described. The receiver of FIG. 2 also includes a first signal-storing adaptive network 19, which may be in the form of a tapped delay line, a shift register or equivalent device on which an input signal I(z) can be distributed and processed. The network 19 is coupled to the input circuit via the Test B positions of two three-position switches 20 and 21. The adaptive network 19 has a transfer characteristic H($z$) and has output terminals 22. The adaptive network 19 is described in detail hereinafter.

The receiver of FIG. 2 further comprises a second input circuit for supplying a signal of given wave form, specifically a pulse wave form. This second input circuit may be sync pulse generator 23 coupled to a stable-frequency oscillator 24 via the Test A and Test B positions of a three-position switch 25. The oscillator 24 may also be coupled to the unit 16 via a connection 26 for controlling the frequency of the local oscillator therein and, conversely, the unit 16 may be coupled to the oscillator 24 via a connection 27 for synchronizing the oscillator and the pulse generator 23 with oscillator 14 at the transmitter. To this end, a pilot or synchronizing signal derived from oscillator 14 at the transmitter is transmitted continuously to synchronize the receiver oscillator 24. Sync pulses from generator 23, which are of very short duration, are applied to a pulse-forming signal generator or network 28 having a transfer characteristic D($z$) which is effective to develop at its output terminals 29 a signal of the desired wave form D($z$).

The receiver of FIG. 2 further comprises a circuit for comparing from instant-to-instant the signal at the output of the adaptive delay line network 19 with the signal of given wave form, specifically the signal of pulse wave form at the output terminals of the unit 28. This comparing circuit may be in the form of a conventional linear combining amplifier unit 30 having two input circuits to which the signals from the units 28 and 19 are applied with opposite polarity, as indicated, the connection to network 19 being via the Test B position of a three-position switch 38. The device 30 differentially combines the pulse components of H($z$) and D($z$) at corresponding times and is thus effective to derive the difference signal of the two input signals, such difference signal being developed at its output terminals 31.

The receiver of FIG. 2 further comprises a second signal-storing adaptive network 32, which may be an adaptive delay line network similar to network 19, coupled to the output terminals of the comparing device 30 via the Test B position of a three-position switch 33. The network 32 has a transfer or response characteristic which is the normalized time-reverse of the wave form of the distorted and dispersed input signal I($z$) at the terminals 18. As explained hereinafter, the translation of the difference signal by the network 32 is effective to develop a correction signal ΔH($z$). The network 32 includes gates having a synchronizing connection to generator 23 via the Test A position of a switch 39, as explained hereinafter with reference to FIG. 9.

The receiver of FIG. 2 further comprises a circuit for applying such correction signal ΔH($z$) to the adaptive network or delay line 19 to modify its response in a sense to decrease such difference signal and by an amount effective to minimize the squared difference between the signals supplied by the two input circuits of the comparison device 30, that is, the signal outputs of the adaptive network 19 and of the network 28. This modification of the response of the network 19 is effected by a linear nondistorting delay line 34. The details of the delay line 34 and its interconnection with the network 19 are described hereinafter. In general, the delay line 34 is provided with a plurality of taps equal in number to the taps of the adaptive network 19. The receiver includes a circuit for applying the correction signal ΔH($z$) at the output of the network 32 via the Test B positions of three-position switches 35 and 36 and a signal repeater 37 having a gain $g_0$ to the delay line 34. As explained hereinafter, the delay line 34 and its associated circuitry includes means for adjusting the gain at each of the taps of the adaptive network 19 proportionally to the instantaneous magnitude of the correction signal ΔH($z$) at the corresponding tap of the linear delay line 34 when the correction signal ΔH($z$) is distributed along it.

Before explaining the operation of the apparatus of FIGS. 1 and 2 in converting an input signal of any wave form into a signal of any given desired wave form, it will be helpful to refer to certain of the fundamental principles involved. Assume that the switch 11 of the transmitter is in the test position shown and that each of the three-position switches 20, 21, 25, 33, 35, 36, 38, and 39 is in the test B positione and that an input signal of wave form I($z$) is fed into the adaptive network 19 having a transfer characteristic H($z$). The output $I(z)\cdot H(z)$ (for brevity, referred to hereinafter merely as IH) is differentially combined in the device 30 with the desired output wave form D($z$) (also, for brevity, referred to as D) and passed through the adaptive network 32 having a transfer characteristic which is the normalized conjugate of I($z$) denoted as $\bar{I}/(I\bar{I})_0$, to develop an output signal $\bar{I}(D-I\bar{H})/(I\bar{I})_0$. This signal is applied to delay line 34 via the switches 35 and 36 and the signal repeater 37 in which the magnitude is multiplied by a fixed value $g_0$ which is not a function of $z$. The resultant signal represents the incremental correction adjustment of ΔH($z$) to H($z$) and has the value:

$$\Delta H(z)=\bar{I}(D-IH)(g_0/(I\bar{I})_0) \qquad (4)$$

This is the desired generalization of Equation 3B.

Referring now to FIG. 3 of the drawings, it may be assumed that a short-duration test pulse of given amplitude from the pulse generator 15 of FIG. 1 is sent out by the transmitter and is dispersed and distorted in the radio and/or telephone link between the transmitter and the receiver and is received in the form of I($z$) of curve ($a$) of FIG. 3. In the Z transform notation, this signal is:

$$I(z)=1z^0+0.6z^{-1}-0.6z^{-2} \qquad (5)$$

It is seen that the received signal I($z$), representing the impulse response of the channel, comprises a desired main pulse of unity amplitude and undesired side pulses each of magnitude 0.6 and of opposite polarity and delayed in time by one and two time cells respectively.

In accordance with the invention, it is desired sequentially to synthesize the network 19 to impart to it a transfer characteristic H($z$) by means of a series of incremental adjustments so that when I($z$) is fed into H($z$) the resultant output IH is to be as close as possible to a desired wave form $D(z)=1$, so that it comprises primarily a main pulse or lobe of unity magnitude with side pulses of much smaller energy content. In FIG. 3, the several columns are graphs of the functions indicated in the headings, as those terms have been heretofore described, while the several rows represent variations in such functions for successive sequential adjustments enumerated by the integer $k=0$, $k=1$, etc.

Following the relationship of Equation 4, it will be assumed for this example that at first H($z$), denoted by H($z$)$^{(0)}$, is equal to zero so that IH$^{(0)}$ is also equal to zero. From Equation 4, ΔH($z$)$^{(0)}$ takes the form $\Delta H(z)^{(0)}=g_0\bar{I}/(I\bar{I})_0$ shown in the first row. Here, the value of $(I\bar{I})_0=1.72$ and the value of $g_0=0.688$ so that $g_0/(I\bar{I})_0=0.4$. Prior to the occurrence of the second short-duration test pulse from the generator 15 of FIG. 1, the delay line 34 will adjust the adaptive network 19, as explained hereinafter, to modify its transfer characteristic by the function ΔH($z$)$^{(0)}$. Since its transfer characteristic was initially zero, obviously it now becomes $H(z)^{(1)}=\Delta H(z)^{(0)}$.

The second of the sequential short-duration test pulses from the generator 15, arriving again as I($z$) in the form represented by graph ($a$), is now applied to the network 19 having the transfer characteristic H($z$)$^{(1)}$ shown in the second row of FIG. 3; the output signal IH$^{(1)}$ of the network 19 is then as shown in the second row and this signal, when compared with $D(z)=1$ in the unit 30, produces a new correction signal ΔH($z$)$^{(1)}$ shown in the second row. This second correction signal is again applied to modify the gains of the taps of the network 19 $H(z)^{(1)}$, resulting in a transfer characteristic $H(z)^{(2)}$ shown in the third row. This process continues for as many sequential operations as there are in the group of short-duration test pulses transmitted by the generator 15 of the transmitter. The results of three of such sequential modifications of the network 19 are shown in the fourth row of FIG. 3. It is apparent that, with each successive adjustment of the network 19, the main pulse of the output signal IH progressively approaches unity value while the undesired side pulses are sequentially and incrementally reduced in magnitude.

The criterion of appraisal of the reduction of the undesired side pulses is the residual pulse-error energy. In FIG. 4, this residual pulse-error energy is plotted against the number of sequential adjustments. It is to be noted that the ordinate of the curve of FIG. 4 continuously decreases as $k$ increases so that all adjustments of the transfer characteristic $H(z)$ of the network 19 always lead to a network with a lower pulse-error energy and not to any intermediate network adjustment at a false and stagnant error minimum.

In FIG. 5 there are shown reproductions of actual oscillograms obtained in the implementation of the receiver system of FIG. 2, using an input signal of wave form $I(z)$ shown by graph (*a*) of FIG. 3. The similarity between the computed output signal, as represented in the bottom row of FIG. 3, and the actual output signal IH shown in FIG. 5 is apparent, as is also apparent the similarity of the computed and actual values of $H(z)$.

The apparatus and method of the invention for converting an input wave signal into a signal of given wave form are also applicable to the correction of received signals $I(z)$ having such extreme distortion that undesired side pulses are of amplitudes equal to, or even greater than, that of the main desired pulse or, in fact, instances in which the main pulse is not discernible, a situation in which adaptive networks heretofore proposed, with the exception of that described and claimed in applicant's said prior patents and copending applications, break down.

As a further example, referring to FIG. 6, it is assumed that a single pulse transmitted by the transmitter of FIG. 1 is received as $I(z)$ comprising two pulses of equal amplitude separated by one time cell, as represented by graph (*a*) of FIG. 6, the other side pulses of lesser amplitude being neglected for simplification. It may be assumed further, for simplification of analysis, that the adaptive network 19 has only three taps for correction or conversion of this input signal $I(z)$ into an output signal IH having a single main pulse with minimal energy side pulses. It can be shown that, with a three-tap network, the optimum transfer characteristic $H(z)$ is known, a priori, to be the following:

$$H(z)=(\tfrac{1}{4})z^{+1}+(\tfrac{1}{2})z^{0}-(\tfrac{1}{4})z^{-1} \qquad (6)$$

This optimal characteristic $H(z)$ is shown in graph (*b*) of FIG. 6 and the output signal IH is shown in graph (*c*). This output signal IH comprises a main pulse of a magnitude ¾ and three side pulses each of a magnitude ¼. The residual minimum pulse-error energy is the sum of the squares of the errors of the main pulse and the three side pulses and has a value ¼. This represents the best that can be achieved with a three-tap correction network. Denoting the gains of the three taps of network 19 as $H_{-1}$, $H_0$, and $H_1$, the succcessive values of these gains, as the network synthesizes itself sequentially, are shown in FIG. 7. It is noted that the values of these three tap gains do in fact approach the a priori optimum values of tap gains shown in FIG. 6 asymptotically.

The residual pulse-error energy, under the assumptions just stated, is shown in the curve of FIG. 8. Again it is to be noted that the residual pulse-error energy approaches asymptotically the minimum values of ¼. Also, this residual pulse-error energy continuously decreases, thereby indicating a converging process rather than a non-converging or diverging process, as occurs in certain prior art apparatus of this type.

Returning now to FIGS. 1 and 2 of the drawings, the manner in which the apparatus there represented is utilized to perform the method of substantial reduction of the distortion and dispersion of a signal received over a distorting and dispersing link is as follows. Assume that, prior to message transmission, the switch 11 of FIG. 1 is placed in the test position as shown. The transmitter is then effective to transmit a first series of repetitive narrow test pulses, the repetition period being at least as long as several times the time dispersion of $I(z)$ which includes components of significant amplitude. For example, there may be transmitted 100 pulses at the rate of 50 pulses per second, for a duration of 2 seconds. These short-duration test pulses from the generator 15 are applied to the unit 12, wherein they are modulated upon a carrier wave and transmitted to the output terminals 13 for transmission. The test pulses from the generator 15 are accurately spaced in time to an accuracy determined by the oscillator 14.

At the receiver of FIG. 2, the switches 20, 21, 25, 33, 35, 36, 38, and 39 are all set in the Test A positions. The received test pulses are translated to the base-band distorted and dispersed signal $I(z)$ in the unit 16 and are applied to the adaptive network 32. When the signal of wave form $I(z)$ is applied to the network 32, it automatically imparts thereto a transfer characteristic $\bar{I}(z)/(I\bar{I})_0$, where $(I\bar{I})_0$ is the value of $I\cdot\bar{I}$ at time $t=0$. This expression is the conjugate or the time-reverse of the impulse response of the dispersing and distorting link as represented by the input signal wave form $I(z)$.

The synthesis of the network 32 to have the characteristic $\bar{I}(I\bar{I})_0$ may be effected as described in applicant's aforesaid Patent 3,206,687 and particularly FIG. 6 thereof. Assuming that the network 32 is a conventional delay line having a number of sections each of unit time delay $z^{-1}$, the apparatus for adjusting the network 32 is shown in FIG. 9. The network 32 is shown as comprising a delay line 50 of which, for clarity, only two adjacent sections are shown. The junction or tap 51 between the two sections $z^{-1}$ is connected via a two-position switch 52 in a Test A position to a combining amplifier 53.

Also associated with each tap is a circular potentiometer 54 having an angularly adjustable contact 55 and connected to a source, such as a battery 56, of unit potential via the Test A position of a two-position switch 57. The potentiometer 54, as well as other tap-gain potentiometers described hereinafter, is designed to have a minimum value desistance sufficiently high in relation to the characteristic impedance of the line as to have no significant effect on the transfer characteristic of the line. The source 56 is connected directly to one terminal of the potentiometer 54 and to the other terminal via a unity-gain polarity-reversing amplifier 58, the mid-point of the potentiometer 54 being grounded as indicated. The contact 55 is connected via the Test A position of a two-position switch 59 to the amplifier 53. The output of amplifier 53 is connected to a gate 60 having a synchronizing input 61 which may be connected to the sync generator 23 of FIG. 2. The output of gate 60 energizes a stepper motor 61*a* having an output shaft coupled to the contact 55, as indicated schematically by the connection 62. The two connections from the gate 60 to the motor 61*a* are to indicate energization of the motor 61*a* with either polarity, depending upon the polarity of the output of amplifier 53. The stepper motor 61*a* may be of any conventional type, for example a Type SS-25 manufactured by the Superior Electric Company of Bristol, Conn.

When the switches 52 and 57 are connected to their Test B positions, the source 56 is disconnected and the tap 51 of the delay line 50 is connected to the potentiometer 54 in lieu thereof. Concurrently, the adjustable contact 55 is connected via the switch 59 and a unity-gain amplifier 63 to a potentiometer 64 having an adjustable contact 65 connected to the output terminal which, as shown in FIG. 2, is the switch 35.

In order to normalize the signal output $I\bar{I}$ of the network 32, that is, to provide a signal output in which the main pulse is of unity amplitude, the adjustable contact 65 is connected via the Test B position of a two-position switch 66 to a peak-hold circuit 67 which may be a conventional circuit for responding to and holding the peak value of an applied signal. The unit 67 is connected to the input of a combining amplifier 68 with negative polarity. The other input of the amplifier 68 is connected to a reference source such as a battery 69 of unit potential. The output of the amplifier 68 is connected to a gate 70 having a synchronizing input connection 71 which may be connected to the sync generator 23 of FIG. 2. The gate 70 has two output circuits for energizing a stepping motor 72 at either of two polarities, depending upon the polarity of the signal output of the amplifier 68. The stepper motor is connected to the adjustable contact 65 by a shaft or other mechanism indicated schematically at 73.

In the operation of the circuit of FIG. 9 to adjust the network 32 to impart to it the desired transfer characteristic, the signal $I(z)$ is impressed on the delay line 50 and distributes itself along the line. Correct phasing of the signal $I(z)$ along the delay line 50 may be determined by observing the output signal on an oscilloscope 40 (FIG. 2). For simplicity, the apparatus for adjusting the gain of a single tap 51 is shown but this apparatus will be duplicated for all other taps. Assuming that the switches 52, 57, 59, and 66 are initially in the Test A positions, as shown, a balanced unit voltage is impressed on the potentiometer 54 and the potential at the adjustable contact 55 is compared with that at the tap 51 by the combining amplifier 53. Upon command of a synchronizing signal on gate 60, the difference signal is impressed on the stepper motor 61*a* to adjust the contact 55 to balance these potentials. This adjustment process is effected in increments upon the occurrence of successive sync pulses so that the setting of the potentiometer contact 55 and like contacts at each other tap of the delay line 50 is such as to provide an instantaneous potential at the switch 59 equal to the instantaneous potential at its associated tap when the signal $I(z)$ is distributed along the delay line 50.

In order to normalize the signal output $I\bar{I}$, switches 52, 59, and 66 are adjusted to their Test B positions. With these connections, the signal $I\bar{I}$, obtained as the combination of the signal at the contact 55 of potentiometer 54 and the signals at all the other taps of delay line 50, is impressed upon the potentiometer 64 and a portion of this potential is applied via switch 66 to the peak-hold circuit 67. The output of the unit 67 is then the peak value $(I\bar{I})_0$ of the signal $I\bar{I}$ and is impressed upon the combining amplifier 68 with a negative polarity wherein it is compared with a unit potential from the source 69 and the difference impressed upon the gate 70. Upon receipt of a sync pulse from the terminal 71, which is effective in selecting the peak value $(I\bar{I})_0$ of $I\bar{I}$ as seen with the oscilloscope 40 of FIG. 2, the gate 70 transmits this difference potential to the stepper motor 72 to actuate it in one sense or the other, thereby adjusting the contact 65 to equalize the peak value $(I\bar{I})_0$ of the output signal $I\bar{I}$ to that of the unit source 69, that is, to normalize the signal to the value $I\bar{I}/(I\bar{I})_0$. For normal operation of the system of FIG. 2, switches 52 and 57 are left on Test B positions while switch 66 is returned to Test A position.

Returning again to FIGS. 1 and 2, the network 32 having been adjusted as described, the switches are all operated to their Test B positions and a second series of repetitive test pulses is sent out by the transmitter and arrive at the receiver having a wave form $I(z)$. Under this condition, the input signal $I(z)$ is applied directly to the adaptive network 19, the output signal of which is applied to the combining amplifier 30. Concurrently, local pulses, synchronous with the transmitted pulses, are generated by the unit 23 at the receiver, for example pulses at the rate of 50 p.p.s., and applied to the network 28 having a desired transfer characteristic $D(z)$. The second series of test pulses at the output of adaptive network 19 are then compared instant-to-instant with the local pulses translated by the network $D(z)$ in a differential amplifier 30 wherein a difference error signal is derived. The difference error signal so derived is passed through the adaptive network 32, adapted as described above, and the amplifier 37 via switches 35, 36 to develop a correction error signal $\Delta H(z)$.

The apparatus by means of which the delay line 34 serves sequentially to adjust the adaptive network 19 to impart to it the desired transfer characteristic $H(z)$ is similar to that described above in connection with adjustment of the network 32. Referring to FIG. 10, it will be assumed that the network 19 is in the form of a delay line with a series of sections each having a unit delay $z^{-1}$ and that the delay line 34 is a linear nondistorting delay line having a number of sections and a number of taps equal to those of the network 19, each section of line 34 also having a delay of $z^{-1}$ per section. The correction signal $\Delta H(z)$ is then applied to the delay line 34 and the instantaneous signal potential at each tap of the network 19 is compared with that of the corresponding tap of the delay line 34 and the gain (attenuation) of the signal from that tap of network 19 to the output terminal 22 is adjusted sequentially proportionally to the instantaneous magnitude of the signal at the corresponding tap of the line 34 when the correction signal $\Delta H(z)$ is distributed along it, as illustrated by the example of FIG. 3. Specifically, a tap 80 of network 19 is connected directly to one terminal of a circular potentiometer 81 and to the other terminal thereof through a unity-gain polarity-reversing amplifier 82. The potentiometer 81 has an adjustable contact 83 which is connected by a unity-gain isolation amplifier 84 to the output terminal 22. The correction signal $\Delta H(z)$, being the output of the amplifier 37 of FIG. 2, is impressed on the delay line 34 and the potential at each of the taps thereof is measured or observed and compared with that at the corresponding tap of the network and the gain at the latter adjusted to bring the two potentials to equality. This operation can be effected by visually observing or measuring the potential at each tap of the network 19 and manually adjusting its associated potentiometer. Alternatively, as shown, the operation is effected automatically and the potential at a tap 85 of delay line 34, corresponding to the tap 80 of the network 19, is applied via an amplifier 86 and a gate 87 to a stepper motor 88, the output shaft of which is connected to the adjustable contact 83 by a mechanism shown schematically at 89. The gate 87 is adapted to be synchronized by an input terminal 90 connected to the sync generator 23 of FIG. 2. Similar elements interconnect other corresponding pairs of taps of the network 19 and the delay line 34, for example as represented by the elements at the next adjacent tap identified by the same reference numerals with a letter "*a*" suffix.

In the operation of the apparatus of FIG. 10, the correction signal $\Delta H(z)$ is applied to the delay line 34 and, when it is distributed therealong as observed by an oscilloscope 91 connected to the Test B position of switch 36, the sync signal from the generator 23 will open all of the gates simultaneously. Each of the gates, such as the gate 87, transmits a voltage pulse proportional to the potential appearing at its associated tap 85 of the delay line 34 to the stepper motor 88 which will step one incremental distance clockwise or counterclockwise, depending upon the polarity of the instantaneous correction signal $\Delta H(z)$ at that particular instant. This operation is effective to adjust the transfer characteristic $H(z)$ of the network 19 in a series of incremental steps, as illustrated and described in connection with FIG. 3 above, so as to minimize the difference between the signal output IH of the adaptive network 19 and the desired signal D(z).

An alternative apparatus for sequentially adjusting the adaptive network 19 is illustrated in FIG. 11. In this figure, the elements corresponding to those of FIG. 10 are identified by similar reference numerals. In the modified circuit of FIG. 11, the potential appearing at each tap of the delay line 34 is applied to an amplitude-to-pulse width converter (APW) unit 92 which is effective to convert an input signal of variable magnitude into a pulse of constant magnitude but of a width proportional to the magnitude of the input signal and of a polarity varying with the polarity of the tap potential. Such a converter is well known and, for example, is illustrated and described in FIGS. 1 and 2 on page 18 of the 1958 IRE Wescon Convention Record, part 5. This variable width pulse is fed to a modulator 93 which, in turn, is fed from a constant-amplitude oscillator 94 of a frequency, for example, of 200 c.p.s. The output of the modulator 93 accordingly comprises a series of pulses spaced by 1/200 second and whose number is proportional to the magnitude of the voltage sample from the tap 85 of delay line 34. Accordingly, these pulses from the modulator 93 are applied to gate 87 which, in response to sync signals from the input terminal 90, translate the pulses to the stepper motor 88 which rotates a number of steps proportional to the magnitude of the signal at the tap 85 from whatever position it previously occupied. In other respects, the operation of the system of FIG. 11 is similar to that of FIG. 10 described above.

Thus the transfer characteristic H(z) of the network 19 is sequentially adjusted as illustrated in FIG. 3, the number of adjustments being equal to the number of pulses transmitted by the generator 15 at the transmitter while the receiver switches are in their Test B positions. The results of the sequential adjustments may be observed on the oscilloscope 91. When the signal is of satisfactory wave form as it appears on the oscilloscope 91, all of the switches at the transmitter and the receiver are actuated to their operate positions and the system is ready to transmit and receive information signals from the source 10 and to supply the same from output terminals 22a, minimizing the pulse-error signal energy and representing an optimum correction of the distortion and dispersion of the signal during its travel over the link between the transmitter and the receiver.

In the systems so far described, the presence of wide-spectrum noise in the channel has been disregarded. However, the invention is capable also of sequentially adjusting in adaptive network to minimize the pulse-error signal energy even in the presence of noise. It can be shown that when there is present wide-spectrum noise having an R.M.S. value $n^2$ on a long-term basis added linearly to the signal I(z), the over-all disturbance energy $e$ is given by the expression:

$$e=((IH-D)(\bar{I}\bar{H}-\bar{D}))_0+n^2(H\bar{H})_0=(H\bar{H})_0((I\bar{I})_0+n^2)+(I\bar{I})_0(RH\bar{H})_0-2(H\bar{D}I)_0+(D\bar{D})_0 \quad (7)$$

In Equation 7, the function R(z) (written simply as R for abbreviation) is defined by the equality $I\bar{I}/(I\bar{I})_0=1+R$, thus being the normalized side lobe wave form at the output terminal of FIG. 9 and of 32 of FIG. 2. Note that the latter R differs from that of Equation 1 in which the R indicates the side lobes of I.

This shows that the over-all disturbance error energy $e$ is a quadratic in the independent coefficients $H_u$ of the correcting network H, where $H_u$ is the value of H(z) at the time cell $u$. For example, the parabolic variation of $e$ for only one independent typical variable $H_u$ is shown in FIG. 13. For any initial coordinate pair ($H_u$, $e$), the change $\Delta H_u$ required in the initial value $H_u$ to achieve the minimum $e$, indicated as $e_{min}$, is given by the relation:

$$\Delta H_u=-e_u/e_{uu} \quad (8)$$

as illustrated in FIGS. 13 and 14. The usual partial differential notation is used where $e_u$ and $e_{uu}$ are, respectively, the first and second partial derivatives of $e$ with respect to $H_u$. Differentiation of Equation 7 thus gives:

$$e_u=2((I\bar{I})_0+n^2)H_u+2(I\bar{I})_0(\bar{R}H)_u-2(D\bar{I})_u \quad (9)$$

$$e_{uu}=2(I\bar{I})_0+n^2) \quad (10)$$

Hence, $$\Delta H(z)=\frac{\bar{I}(D-IH)-n^2H}{((I\bar{I})_0+n^2)} \quad (11)$$

When all of the taps of network 19 are changed simultaneously, it will be shown below that, to achieve convergence in the sequential adjustment of H(z), a fraction $g_0$ of the $\Delta$H(z) of Equation 11 should be used. Thus, to any value $H^{(k)}$ at the $k$th step in the adaptation process of H(z) the increment $g_0\Delta H(z)^{(k)}$ obtained from Equation 11 is to be added to obtain $H^{(k+1)}$ at the $(k+1)$ step. That is, $$H(z)^{(k+1)}=H(z)^{(k)}+\Delta H(z)^{(k)} \quad (12)$$

Thus, $H(z)^{(k)}$ adapts according to the equation:

$$H(z)^{(k+1)}=A(z)+B(z)H(z)^{(k)} \quad (13)$$

where $$A(z)=g_0D\bar{I}/(n^2+(I\bar{I})_0)$$

and $$B(z)=\frac{n^2(1-g_0)+(I\bar{I})_0(1-g_0(1+R)}{n^2+(I\bar{I})_0}$$

Equation 13 is a difference equation representing the difference between two successive values of H(z) in the adaptation process.

The solution of Equation 13 is:

$$H(z)^{(k)}=A(1-B^k)/(1-B)+B^kH(z)^{(0)} \quad (14)$$

in which $(k)$ refers to the $k$th readjustment of H(z) denoted by $H(z)^{(k)}$. Note, however, that $B^k$ means, as usual, B raised to the $k$ power. Again A(z), B(z), D(z), I(z), and R(z) are abbreviated by using A, B, D, I, and R.

The over-all disturbance energy $e^{(k)}$ at the $k$th step is obtained by inserting the value of $H(z)^{(k)}$ from Equation 14 into Equation 7. The over-all result shows that as the adaptation process on H(z) continues, with $k$ taking on the sequential values of $k=0$, 1, 2, etc. (as in FIG. 3) to infinity, the residual over-all disturbance energy $e^{(k)}$ continuously decreases (as in FIG. 4), provided the gain $g_0$ is greater than zero, but has an upper limit given by:

$$g_0<\frac{2(n^2+(I\bar{I})_0)}{n^2+(1+R)(I\bar{I})_0} \quad (15)$$

The desired condition of a continual decrease of $e^{(k)}$, assured by this invention, for any arbitrary wave form of the channel impulse response I(z), including those with zeros outside the unit circle in the Z plane, is in sharp contradistinction with previously proposed adaptive systems for which, in such cases, the disturbance energy actually increases and is not convergent.

In the absence of channel noise, Equation 15 becomes simply $g_0<2/(1+R)$. For example, in the sequential adjustment process represented in FIGS. 6, 7, and 8, $(1+R)$ never exceeds 2 so that convergence is obtained when $g_0$ is less than unity and a value of 0.8 was assumed. The condition for convergence of $g_0$ given in Equation 15 can be implemented in a straightforward manner but, in practice, it is simpler to just make $g_0$ small enough, say a value of 1/10, to assure convergence for most cases of interest.

The extension of the system of FIG. 2 to take into account wide-spectrum noise is illustrated in FIG. 12 in which units corresponding to those of FIG. 2 have the same reference numerals. Referring to FIG. 12, it will be assumed that the input signal is represented by $I(z)+n^2$, the latter term $n^2$ representing the presence of wide-spectrum noise of power equal to $n^2$. The system of FIG. 12 includes a circuit for developing a pulse signal having an amplitude equal to the R.M.S. value $n^2$ of the noise on a long-term basis and at time $t=0$. Such a pulse signal is developed by a connection from the input terminal via switch 100 to a power meter 101 which is responsive, in the absence of an input signal I($z$), to channel noise and is effective to develop a unidirectional potential which is respresentative of $n^2$. The unit 101 is coupled to a D.C. hold circuit 102 which, in turn, is coupled to a modulator 103 pulsed by a sync pulse from generator 23 of FIG. 2.

The system of FIG. 12 further includes a third adaptive network 104, preferably in the form of a delay line, coupled to the modulator 103 and having a response characteristic H($z$) similar to that of the main adaptive network 19 so that its output is $H(z)\cdot n^2$. The system of FIG. 12 further comprises a circuit for comparing from instant-to-instant the signal output of the adaptive network 32, $\bar{I}(D-IH)$ and the output of network 104, $H(z)\cdot n^2$, for developing a correction signal and for applying such correction signal sequentially to adjust the transfer characteristics H($z$) of the networks 19 and 104. This latter circuit is illustrated as a combining amplifier 105 to which the signal outputs of the adaptive networks 32 and 104 are differentially applied. The output of the amplifier 105 is applied to an amplifier (attenuator) 106 to develop the correction signal ΔH($z$) represented by Equation 11.

In the operation of the system of FIG. 12, the adaptive network 32 is set up to have a transfer characteristic Ī($z$), in the manner described in connection with FIG. 9, and the difference signal $D-IH$ is applied thereto. With no pulses transmitted by the generator 15 of FIG. 1, the wide-spectrum noise $n^2$ is applied from the input terminal via switch 100 to the power meter 101 and D.C. hold unit 102 wherein there is developed a unidirectional potential which is proportional to $n^2$. This potential, as well as a sync pulse from generator 23 (FIG. 2), is applied to modulator 103 which develops a pulse at time $t=0$ and of a magnitude proportional to $n^2$.

The noise representative pulse output of modulator 103 is applied to the adaptive network 104 having a transfer characteristic H($z$) the same as the adaptive network 19. The signal outputs of the networks 32 and 104 are applied to the combining amplifier 105 the output of which, after amplification (attenuation) in the amplifier 106, is utilized sequentially to adjust the transfer characteristics H($z$) of both the networks 19 and 104 in the manner described in connection with FIG. 10.

The system of FIG. 12, in accordance with Equation 11, is effective to convert the input noisy signal I($z$) into a signal approximating D($z$) in which the difference pulse-error energy is a minimum.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a wave-signal translating channel, an apparatus for converting an input wave signal into a signal of a given wave form comprising:

a first input circuit for supplying a signal of a wave form to be converted;

a first signal-storing adaptive network coupled to said input circuit and having an output circuit at which said converted input signal appears;

a second input circuit for supplying a signal of said given wave form;

a circuit for comparing from instant-to-instant the signal at said network output circuit with said signal of given wave form and deriving the difference signal;

a second signal-storing adaptive network coupled to the output of said comparing circuit and having a response which is the time-reverse of the wave form of said input signal for developing a correction signal;

and a circuit for applying said correction signal to said first adaptive network to modify its response in a sense to decrease the energy of said difference signal.

2. In a pulse-signal communication channel subject to signal distortion arising from nonlinear phase-frequency and nonflat amplitude-frequency characteristics, an apparatus for restoring a signal received via such channel to a signal of pulse wave form comprising:

a first input circuit for supplying a distorted signal received from said channel;

a first signal-storing adaptive network coupled to said input circuit and having an output circuit at which said restored input signal appears;

a second input circuit for supplying a signal of pulse wave forms;

a circuit for comparing from instant-to-instant the signal at said network output circuit with said signal of pulse wave form and deriving the difference signal;

a second signal-storing adaptive network coupled to the output of said comparing circuit and having a response which is the time-reverse of the wave form of said received signal for developing a correction signal;

and a circuit for applying said correction signal to said first adaptive network to modify its response in a sense to decrease the energy of said difference signal.

3. In a wave-signal translating channel, an apparatus for converting an input wave signal into a signal of a given wave form comprising:

a first input circuit for supplying a signal of a wave form to be converted;

a first adaptive delay line coupled to said input circuit and having an output circuit at which said converted input signal appears;

a second input circuit for supplying a signal of said given wave form;

a circuit for comparing from instant-to-instant the signal at said delay line output circuit with said signal of given wave form and deriving the difference signal;

a second adaptive delay line coupled to the output of said comparing circuit and having a response which is the time-reverse of the wave form of said input signal for developing a correction signal;

and a circuit for applying said correction signal to said first adaptive delay line to modify its response in a sense to decrease the energy of said difference signal.

4. In a wave-signal translating channel, an apparatus for converting an input wave signal into a signal of a given wave form comprising:

a first input circuit for supplying a signal of a wave form to be converted;

a first adaptive tapped delay line coupled to said input circuit and having an output circuit at which said converted input signal appears;

a second input circuit for supplying a signal of said given wave form;

a circuit for comparing from instant-to-instant the signal at said delay line output circuit with said signal of given wave form and deriving the difference signal;

a second adaptive delay line coupled to the output of said comparing circuit and having a response which is the time-reverse of the wave form of said input signal for developing a correction signal;

a linear nondistorting delay line having a plurality of taps equal in number to those of said first adaptive tapped delay line;

a circuit for applying said correction signal to said linear delay line;

and means for adjusting the gain at each of the taps of said first adaptive delay line proportionally to the instantaneous magnitude of the signal at the corresponding tape of said linear delay line when said correction signal is distributed along it.

5. In a wave-signal translating channel, an apparatus for converting an input wave signal into a signal of a given wave form comprising:

a first input circuit for supplying a signal of a wave form to be converted;

a first signal-storing adaptive network coupled to said input circuit and having an output circuit at which said converted input signal appears;

a second input circuit for supplying a signal of said given wave form;

a circuit for comparing from instant-to-instant the signal at said network output circuit with said signal of given wave form and deriving the difference signal;

a second signal-storing adaptive network coupled to the output of said comparing circuit and having a response which is the time-reverse of the wave form of said input signal for developing a correction signal;

and a circuit for applying said correction signal to said first adaptive network to modify its response in a sense and by an amount effective to minimize the squared difference between the signals supplied by said two input circuits.

6. In a wave-signal translating channel, an apparatus for converting an input wave-signal and accompanying wide-spectrum noise into a signal of a given wave form comprising:

a first input circuit for supplying a signal of a wave form to be converted;

a first signal-storing adaptive network coupled to said input circuit and having an output circuit at which said converted input signal appears;

a second input circuit for supplying a signal of said given wave form;

a circuit for comparing from instant-to-instant the signal at said network output circuit with said signal of given wave form and deriving the difference signal;

a second signal-storing adaptive network coupled to the output of said comparing circuit and having a response which is the time-reverse of the wave form of said input signal for developing a correction signal;

a circuit for developing a pulse signal of magnitude equal to the R.M.S. value of said noise;

a third signal-storing adaptive network coupled to said last-named circuit and having a response characteristic similar to that of said first adaptive network;

a circuit for comparing from instant-to-instant the signal outputs of said second and third adaptive networks for developing a correction signal;

and a circuit for applying said correction signal to said first and third adaptive networks to modify their responses in a sense to decrease the energy of said correction signal.

7. In a pulse-signal communication channel subject to signal distortion arising from nonlinear phase-frequency and nonflat amplitude-frequency characteristics, an apparatus for restoring a signal received via such channel and accompanying wide-spectrum noise to a signal of pulse wave form comprising:

a first input circuit for supplying a distorted signal received from said channel;

a first signal-storing adaptive network coupled to said input circuit and having an output circuit at which said restored input signal appears;

a second input circuit for supplying a signal of pulse wave form;

a circuit for comparing from instant-to-instant the signal at said network output circuit with said signal of pulse wave form and deriving the difference signal;

a second signal-storing adaptive network coupled to the output of said comparing circuit and having a response which is the time-reverse of the wave form of said received signal for developing a correction signal;

a circuit for developing a pulse signal having an amplitude equal to the R.M.S. value of said noise;

a third signal-storing adaptive network coupled to said last-named circuit and having a response characteristic similar to that of said first adaptive network;

a circuit for comparing from instant-to-instant the signal outputs of said second and third adaptive networks for developing a correction signal;

and a circuit for applying said correction signal to said first and third adaptive networks to modify their responses in a sense to decrease the energy of said correction signal.

8. The method of converting an input wave signal into a signal of a given wave form comprising:

passing said input signal through a first signal-storing adaptive network;

comparing from instant-to-instant the output signal of said adaptive network with a signal of said given wave form and deriving therefrom a difference signal;

translating said difference signal with a response which is the time-reverse of the wave form of said input signal to develop a correction signal;

and applying said correction signal to said first adaptive network to modify its response in a sense to decrease the energy of said difference signal.

9. In a signal transmitter-receiver system including a link having nonlinear phase-frequency and nonflat amplitude-frequency characteristics resulting in distortion and dispersion of a transmitted signal and including first and second signal-storing adaptive networks in the receiver, the method of substantially reducing such signal distortion comprising:

transmitting a first series of repetitive test pulses;

applying said test pulses to a first of said adaptive networks to impart thereto a response which is the time-reverse of the response of said link;

thereafter transmitting a second series of repetitive test pulses;

passing said second test pulses through the second of said adaptive networks;

generating local pulses at the receiver synchronous with the transmitted pulses;

comparing from instant-to-instant the second test pulses at the output of said second adaptive network and said local pulses and deriving therefrom a difference signal;

passing said difference signal through said first adaptive network to develop a correction signal;

and applying said correction signal to said second adaptive network to modify its response in a sense to decrease the energy of said difference signal.

10. In a signal transmitter-receiver system including a link having nonlinear phase-frequency and nonflat amplitude-frequency characteristics resulting in distortion and dispersion of a transmitted signal and including first and second adaptive delay lines in the receiver, said second adaptive delay line having a plurality of electrically spaced taps, the method of substantially reducing such signal distortion comprising:

transmitting a first series of repetitive test pulses;

applying said test pulses to a first of said adaptive delay lines to impart thereto a response which is the time-reverse of the response of said line;

thereafter transmitting a second series of repetitive test pulses;

passing said second test pulses through the second of said adaptive delay lines;

generating local pulses at the receiver synchronous with the transmitted pulses;

comparing from instant-to-instant the second test pulses at the output of said second adaptive delay line and said local pulses and deriving therefrom a difference signal;

passing said difference signal through said first adaptive delay line to develop a correction signal;

passing said correction signal through a linear nondistorting delay line having a plurality of taps equal in number to those of said second adaptive delay line;

determining the instantaneous magnitude of the signal at each of the taps of said linear delay line when said correction signal is distributed along it;

and adjusting the gain at each of the taps of said second adaptive delay line proportionally to the instantaneous magnitude of the signal at the corresponding tap of said linear delay line.

11. In a signal transmitter-receiver system including a link having nonlinear phase-frequency and nonflat amplitude-frequency characteristics resulting in distortion and dispersion of a transmitted signal and including first and second adaptive delay lines in the receiver, the method of substantially reducing such signal distortion comprising:

transmitting a first series of repetitive test pulses;

applying said test pulses to a first of said adaptive delay lines to impart thereto a response which is the time-reverse of the response of said link;

thereafter transmitting a second series of repetitive test pulses;

passing said second test pulses through the second of said adaptive delay lines;

generating local pulses at the receiver synchronus with the transmitted pulses;

comparing from instant-to-instant the second test pulses at the output of said second adaptive delay line and said local pulses and deriving therefrom a difference signal;

passing said difference signal through said first adaptive delay line to develop a correction signal;

applying the output of said first adaptive delay line to said second adaptive delay line to modify its response in a sense to decrease the energy of said difference signal;

and applying a received signal to said second adaptive delay line with its response modified as aforesaid.

References Cited

UNITED STATES PATENTS

| | | | |
|---|---|---|---|
| 3,071,739 | 1/1963 | Runyon | 333—18 |
| 3,241,077 | 3/1966 | Smyth et al. | 328—165 |
| 3,283,063 | 11/1966 | Kawashima et al. | 178—5 |

ROBERT L. GRIFFIN, *Primary Examiner.*

B. V. SAFOUREK, *Assistant Examiner.*